(12) United States Patent
Barancyk et al.

(10) Patent No.: US 7,611,772 B2
(45) Date of Patent: Nov. 3, 2009

(54) MULTI-COMPONENT COATINGS THAT INCLUDE POLYUREA COATING LAYERS

(75) Inventors: Steven V. Barancyk, Wexford, PA (US); Dan M. Brayts, Sr., Willoughby, OH (US); Joseph DiMario, Troy, MI (US); Thomas R. Hockswender, Gibsonia, PA (US); Jonathan T. Martz, Glenshaw, PA (US); Joseph Morales, Cleveland, OH (US); Howard L. Senkfor, South Euclid, OH (US); Jose C. Trindade, Westlake, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 687 days.

(21) Appl. No.: 11/211,188

(22) Filed: Aug. 25, 2005

(65) Prior Publication Data

US 2006/0046068 A1    Mar. 2, 2006

Related U.S. Application Data

(60) Provisional application No. 60/606,661, filed on Sep. 2, 2004, provisional application No. 60/606,670, filed on Sep. 2, 2004, provisional application No. 60/606,638, filed on Sep. 2, 2004, provisional application No. 60/606,672, filed on Sep. 2, 2004, provisional application No. 60/606,639, filed on Sep. 2, 2004, provisional application No. 60/606,662, filed on Sep. 2, 2004.

(51) Int. Cl.
*B32B 27/40*    (2006.01)
*C08G 18/00*    (2006.01)

(52) U.S. Cl. .............. 428/423.1; 525/452; 525/453; 525/458

(58) Field of Classification Search .............. None
See application file for complete search history.

(56) References Cited

U.S. PATENT DOCUMENTS

| 5,162,388 A * | 11/1992 | Primeaux, II ............ 521/159 |
|---|---|---|
| 6,013,755 A | 1/2000 | Primeaux, II et al. ......... 528/68 |
| 6,403,752 B1 | 6/2002 | House et al. ............... 528/64 |
| 6,613,389 B2 | 9/2003 | Li et al. ................. 427/388.1 |
| 6,930,155 B2 * | 8/2005 | Weiss et al. ............... 525/424 |
| 2003/0047836 A1 | 3/2003 | Rickner et al. ............ 264/235 |
| 2003/0105220 A1 | 6/2003 | Gupta et al. .............. 524/589 |
| 2003/0118739 A1 | 6/2003 | Li et al. .................. 427/421 |

FOREIGN PATENT DOCUMENTS

| EP | 0 287 192 A2 | 2/1988 |
|---|---|---|
| EP | 0 517 466 A2 | 6/1992 |
| WO | WO 02/28935 A1 | 4/2002 |
| WO | WO 02/102869 A1 | 12/2002 |

* cited by examiner

*Primary Examiner*—James Seidleck
*Assistant Examiner*—John J Figueroa
(74) *Attorney, Agent, or Firm*—Robert A. Diaz; Deborah M. Altman

(57) ABSTRACT

A polyurea composition, a multi-component composite coating and articles formed therefrom, and methods of forming the same are disclosed. The coating composition is formed from a reaction mixture comprising an isocyanate-functional component and an amine-functional component. The ratio of equivalents of isocyanate groups to equivalents of amine groups is greater than 1 while the volume mixing ratio of the isocyanate-functional component to the amine-functional component is capable of being applied to a substrate at 1:1.

25 Claims, 1 Drawing Sheet

MULTI-COMPONENT COATINGS THAT INCLUDE POLYUREA COATING LAYERS

CROSS-REFERENCE TO RELATED APPLICATIONS

This application claims the benefit of priority from U.S. Provisional Patent Application Nos. 60/606,661; 60/606,670; 60/606,638; 60/606,672; 60/606,639 and 60/606,662, all filed Sep. 2, 2004.

FIELD OF THE INVENTION

The present invention relates to multi-component coating compositions applied to substrates, in particular to provide protection from corrosion, abrasion, impact damage, chemicals, UV light and/or other environmental conditions.

BACKGROUND OF THE INVENTION

Coating compositions find use in various industries including the coating and/or painting of motor vehicles. In these industries, and in the automotive industry in particular, considerable efforts have been expended to develop coating compositions with improved performance (both protective and aesthetic) properties. In the automotive industry, coatings have been applied to various component substrates for both protective and aesthetic purposes. Coatings are used to protect vehicle components against cosmetic damage (e.g., denting, scratching, discoloration, etc.) due to corrosion, abrasion, impacts, chemicals, ultraviolet light, and other environmental exposure. Additionally, color pigmented and high-gloss clear coatings typically further serve as decorative coatings when applied to vehicle body substrates. Multi-component composite coatings (for example, color-plus-clear composite coatings) have been used extensively to these ends. These multi-component coatings may include up to six or more individually applied coating layers over the substrate by one or more coating methods, including either electrophoretic or non-electrophoretic coating methods.

Polyurea elastomers have been among the coating compositions commercially applied to various substrates to provide protection to the substrates and to improve properties of the substrates. Polyurea compositions have been used as protective coatings in industrial applications for coating of process equipment to provide corrosion resistance or as caulks and sealants in a variety of aggressive environments. In addition, polyurethane elastomers have been used to line rail cars and truck beds. Such coatings for rail cars and trucks provide protection from cosmetic damage as well as protection from corrosion, abrasion, impact damage, chemicals, UV light and other environmental conditions.

However, certain prior art polyurea coating systems have been known to have deficiencies that inhibit their effectiveness in providing adequate protection to the substrate or to improve properties of the substrate. For example, known polyurea coating compositions may have relatively high viscosity that inhibits flow over the substrate or other underlying coating compositions. Also, certain polyurea coating compositions may have poor adhesion properties to a previously applied coating or to the substrate itself.

Accordingly, it is desirable to provide polyurea coating compositions that may enhance adhesion to previously applied coatings or to the substrate, and/or have a relatively lower viscosity that improves the flowable state of the coating composition for a longer period of time.

SUMMARY OF THE INVENTION

The present invention is directed to a polyurea coating composition, the coating composition being formed from a reaction mixture comprising an isocyanate-functional component and an amine-functional component. The ratio of equivalents of isocyanate groups to equivalents of amine groups is greater than 1 while the volume mixing ratio of the isocyanate-functional component to the amine-functional component is capable of being applied to a substrate at 1:1.

An additional embodiment of the present invention is directed to a coated article comprising a substrate and the polyurea coating composition deposited on at least a portion of the substrate.

The present invention is also directed to a multilayer, composite coating, multi-component, i.e., comprising a first polyurea layer deposited from a first composition, and a second polyurea layer deposited from a second composition, applied over at least a portion of the first polyurea layer. At least one of the first composition and the second composition is formed from a reaction mixture comprising an isocyanate-functional component and an amine-functional component. The ratio of equivalents of isocyanate groups to equivalents of amine groups is greater than 1 while the volume mixing ratio of the isocyanate-functional component to the amine-functional component is capable of being applied to the substrate at 1:1

Additionally provided is a method of forming a polyurea coating on a substrate. The method comprises selecting an isocyanate-functional composition and an amine-functional composition such that the ratio of equivalents of isocyanate groups to equivalents of amine groups is greater than 1 while the volume mixing ratio of the isocyanate-functional component to the amine-functional component is capable of being applied to the substrate at 1:1. The isocyanate-functional composition and the amine-functional composition are mixed in a volume ratio to produce a reaction mixture.

The present invention is additionally directed to a method of forming a coated article. The method comprises providing a substrate and depositing a multilayer composite coating on at least a portion of the substrate to form the coated article. The multilayer composite coating comprises a first polyurea layer deposited from a first composition, and a second polyurea layer, deposited from a second composition, applied over at least a portion of the first polyurea layer. At least one of the first composition and the second composition is formed from a reaction mixture comprising an isocyanate component and an amine component, wherein the ratio of equivalents of isocyanate groups to equivalents of amine groups in the reaction mixture is greater than 1 while the volume mixing ratio of the isocyanate-functional component to the amine-functional component is capable of being applied to a substrate at 1:1.

It should be understood that this invention is not limited to the embodiments disclosed in this summary, but it is intended to cover modifications that are within the spirit and scope of the invention, as defined by the claims.

DETAILED DESCRIPTION OF THE INVENTION

Figure 1:
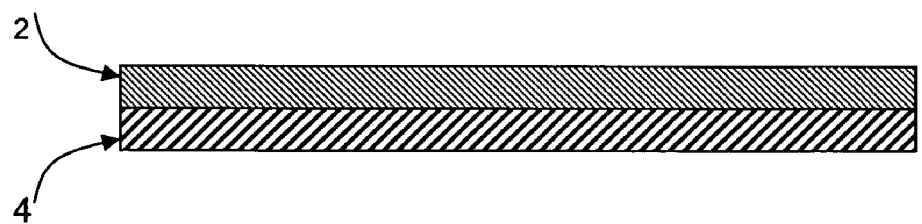
FIG. 1 is a composite article according to an embodiment of the invention including a metal foil carrier film having a coating layer on one side.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In the disclosure of the present invention, by "polymer" is meant a polymer including homopolymers and copolymers, and oligomers. By "composite material" is meant a combination of two or more differing materials.

As used herein, polymer or oligomer molecular weight is determined by gel permeation chromatography (GPC) using appropriate standards, in many cases polystyrene or sulfonated polystyrene. Unless otherwise indicated, molecular weight refers to number average molecular weight (Mn).

As used herein, an object is deemed to have "color" when the object has specific numeric values of L*(value) (i.e. lightness or darkness) and C* (chroma) (i.e. strength) as determined by measurements defined by the Commission Internationale de l'Eclairage (CIE), which is the international standards organization for color, using the CIELCH method, as set forth in, for example, http://www.datacolor.com/color_experts_004.shtml and http://www.xrite.com/documents/literature/en/L10-001_Understand_Color_en.pdf, which are incorporated herein by reference herein in their entirety. L* and C* are numerical values that refer to the lightness and chroma values, respectively, of a particular point in color space as defined by the CIE. L, C, and H (hue angle) may be automatically calculated from measured tristimulus values X, Y, Z based on the following equations: $L=116(Y/Y_n)^{1/3}-16$; $C=(a^2+b^2)^{1/2}$; $H =\arctan (b^*/a^*)$; $a^*=500[(X/X_n)^{1/3}-(Y/Y_n)^{1/3}]$; $b^*=200[(Y/Y_n)^{1/3}-(Z/Z_n)^{1/3}]$, where $X_n$, $Y_n$, and $Z_n$ are the coordinates of a standard white sample that is used to calibrate the instrument prior to use. For purposes of the present invention, an object having "color" exhibits an L* value of greater than 20.0 (lower numbers being darker), and a C* value greater than 1.0 (lower numbers being weaker). These values are calculated using a 0/45 spectrophotometer, and specific illuminant and standard observer (D65/10) as defined by the CIE. The 0/45 spectrophotometer uses a 0 degree illumination and 45 degree observation when measuring a sample. The D65/10 illuminant/degree observer is an industry standard, and refers to a daylight type of lighting (D65), and the degree observer (10) employed. The degree observer refers to a mathematical model for an "average" observer using a 10 degree visual field. Any object having a color measurement falling outside this range (i.e. wherein the L* value is in the range of 20.0 or less and the C* value is in the range of 1.0 or less) is expressly excluded, is deemed to be "black", and does not exhibit "color" for the purposes of this invention.

An object having a color that "substantially corresponds" to the color of another object, as that term is used herein, refers to an object that has a color which approximates the color of the other object as determined by one of skill in the art, the closeness of which is determined by visual appraisal as is conventionally used for most corresponding color appraisals in, for example, the vehicle industry. Visual appraisal allows for the color impression to be evaluated across all angles of light incidence and observation, which is important when viewing some body colors. This method also provides judgment of closeness of match between objects that varied textured surfaces, such as vehicle bedliners to the body color, and may take into consideration effect pigments, if present, which introduces angle-dependent color (goniochromaticity) and/or sparkling effects. An object having a color that "substantially coordinates" with the color or another object, as that term is used herein, refers to an object that has a color that compliments the color of the other object, which is determined by visual appraisal as is conventionally used for most color appraisals in, for example, the vehicle industry.

As used herein, the term "vehicle body" refers to the visible exterior and/or interior components of a coated vehicle that are, generally, not manufactured to withstand relatively heavy abrasion and/or wear resistance from activities such as loading, storage, foot traffic, and the like. These components, when assembled, form the "vehicle body." For example, for a truck body, these components may include on or more of the vehicle exterior components, such as the side panels, doors, hood, roof, trunk, and the like, and the vehicle interior components, such as dashboard, carpeting, seating upholstery, trim, and the like. For a railcar, these components may include, for example, the exterior side walls, doors, and the like. In contrast for purposes of a "vehicle substrate" having a color that substantially corresponds to a "vehicle substrate" the term "vehicle substrate" refers to the underlying material of those vehicle components that are manufactured specifically to withstand relatively heavy abrasive or wear resistance activities. Where the vehicle is a truck, for example, these components may be a truck bed, running boards, bumper, and the like. For a railcar, these components may be, for example, the railcar bed. As used herein, the abrasive or wear resistant vehicle components formed from the vehicle substrate, when combined with an "associated vehicle body" may form substantially the entirety of the vehicle exterior and/or interior. Other "vehicle bodies" contemplated by the present invention include, for example, those vehicle bodies associated with recreational and watercraft vehicles.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The coatings including the multi-component composite coatings, of the present invention can be applied to virtually any substrate non-limiting examples of the suitable non-metallic substrates include natural and/or synthetic stone, ceramics, glass, brick, cinderblock and composites, thereof; wallboard, drywall, sheetrock, cement board; plastics, composite plastics including SMC, GTX, nylon, melamine and/or acrylic composites, TPO, TPV, polypropylene, PVC, styrofoam and the like; wood, wood laminates and/or wood composites, asphalt, fiberglass, concrete, any release surface capable of providing free-films as well as materials suitable for use as flooring materials. The polyurea coatings also may be applied directly to soil or gravel. In an embodiment of the invention the polyurea coating composition may be applied to glass substrates, for example, automotive glass substrates. In such an embodiment, the polyurea coating can be applied to glass for example, as an applique, or as an attachment medium for components or hardware mounted to the glass, or as a sound dampener.

In one embodiment, the polyurea compositions of the present invention can be used to form particles via injection molding techniques or casting techniques. Examples of such articles formed using such processes include, but are not limited to flooring tiles, roofing shingles, floor mats or pads, polyurea films or sheets, decorative figures, rods, planking material, bench top coverings and the like.

Metallic substrates suitable for use in the present invention include, for example, ferrous metals, zinc, copper, magnesium, and/or aluminum, and alloys thereof, and other metal and alloy substrates typically used in the manufacture of automobile and other vehicle bodies. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Very often the substrates are truck bodies or truck beds.

The multi-component composite coatings of the present invention may also be applied over plastic substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

The present invention may, but need not, include a first coating composition and a second coating composition, each of which may be applied in at least one layer over the substrate. Accordingly, although the present invention may be generally described herein as a composite coating, the first coating composition is optional and may, but need not, be applied over the substrate or over a previously applied coating, as an underlayer to the second coating composition.

The first coating composition used in the formation of the multi-component composite coating of the present invention may be selected from electrodepositable film-forming compositions, primer compositions, pigmented or non-pigmented monocoat compositions, pigmented base coat compositions, transparent topcoat compositions, industrial coating compositions, and other coatings commonly used in the original equipment manufacture of automobiles or in automotive refinish. The first coating composition often comprises a multi-layer coating formed from combinations of at least two of the above-mentioned coating compositions. Non-limiting examples include an electrophoretically-applied composition followed by a spray-applied primer composition, or an electrophoretically-applied composition followed by a spray-applied primer composition and then a monocoat composition, or an electrophoretically-applied composition followed by a spray-applied primer composition and then a color-plus-clear composite coating. Alternatively, the first coating composition may be a single composition applied directly to a metal substrate that optionally has been pretreated, or to a substrate that has been coated previously with one or more protective and/or decorative coatings. The second coating composition may be applied directly over any of the compositions indicated above as the first coating composition.

The first coating composition typically comprises a crosslinking agent that may be selected, for example, from aminoplasts, polyisocyanates, including blocked isocyanates, polyepoxides, beta-hydroxyalkylamides, polyacids, anhydrides, organometallic acid-functional materials, polyamines, polyamides and mixtures of any of the foregoing.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®. Particularly useful aminoplasts include CYMEL® 385 (suitable for water-based compositions), CYMEL® 1158 imino-functional melamine formaldehyde condensates, and CYMEL® 303.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate which is utilized as a crosslinking agent can be prepared from a variety of isocyanate-functional materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

If the polyisocyanate is to be blocked or capped, any suitable aliphatic, cycloaliphatic, or aromatic alkyl monoalcohol known to those skilled in the art can be used as a capping agent for the polyisocyanate. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexylmethyl)adipate. Higher molecular weight polyepoxides, including the polyglycidyl ethers of polyhydric phenols and alcohols described below, are also suitable as crosslinking agents.

Beta-hydroxyalkylamides are suitable curing agents for polymers having carboxylic acid groups. The beta-hydroxyalkylamides can be depicted structurally as follows:

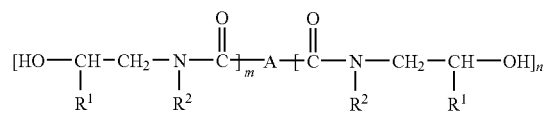

where $R^1$ is H or $C_1$ to $C_5$ alkyl; $R^2$ is H, $C_1$ to $C_5$ alkyl, or

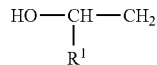

wherein $R^1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable as curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811 at column 6, line 45 to column 9, line 54, which is incorporated herein by reference.

Useful organometallic complexed materials which can be used as crosslinking agents include a stabilized ammonium zirconium carbonate solution commercially available from Magnesium Elektron, Inc. under the trademark BACOTE™ 20, stabilized ammonium, zirconium carbonate, and a zinc-based polymer crosslinking agent commercially available from Ultra Additives Incorporated under the trademark ZINPLEX 15.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Suitable polyamide crosslinking agents include those derived from fatty acids or dimerized fatty acids or polymeric fatty acids and aliphatic polyamines. For example, the materials commercially available from Henckel under the trademark designations VERSAMIDE 220 or 125 are quite useful herein.

Appropriate mixtures of crosslinking agents may also be used in the invention. The amount of the crosslinking agent in the first coating composition generally ranges from 5 to 75 percent by weight based on the total weight of resin solids (crosslinking agent plus film-forming resin) in the first coating composition.

The first coating composition may further comprise at least one film-forming resin having functional groups that are reactive with the crosslinking agent. The film-forming resin in the first coating composition may be selected from any of a variety of polymers well-known in the art. In an embodiment of the invention the film-forming resin can be selected from acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art where the polymers are water dispersible, emulsifiable, or of limited water solubility. The functional groups on the film-forming resin in the first coating composition may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from 13 to 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

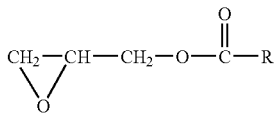

where R is a hydrocarbon radical containing from 4 to 26 carbon atoms. Typically, R is a branched hydrocarbon group having from 8 to 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the polymeric film-forming resin in the first coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4-and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, and urea may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the polymeric film-forming resin in the first coating composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate-functional polyurethane can be reacted with a hydroxyalkyl carbamate to yield a carbamate functional polyurethane.

Other functional groups such as amide, thiol, and urea may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

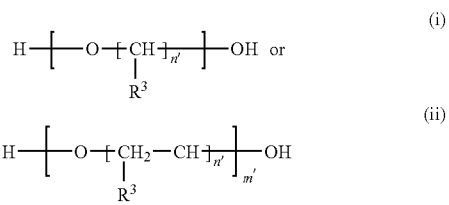

where the substituent $R^3$ is hydrogen or lower alkyl containing from 1 to 5 carbon atoms including mixed substituents, and n' is typically from 2 to 6 and m' is from 8 to 100 or higher. Included are poly(oxytetramethylene) glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

The polyether polymer typically has a number average molecular weight of from 500 to 5000, more often from 1100 to 3200 as determined by gel permeation chromatography using a polystyrene standard, and an equivalent weight of within the range of 140 to 2500, often 500, based on equivalents of reactive pendant or terminal groups. The equivalent weight is a calculated value based on the relative amounts of the various ingredients used in making the polyether polymer and is based on solids of the polyether polymer.

Suitable epoxy functional polymers for use as the film-forming resin in the first coating composition may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of 80° C. to 160° C. for 30 to 180 minutes until an epoxy group-containing resinous reaction product is obtained.

The equivalent ratio of reactants; i. e., epoxy:polyhydroxyl group-containing material is typically from 1.00:0.75 to 1.00:2.00.

The polyepoxide by definition has at least two 1,2-epoxy groups. In general the epoxide equivalent weight of the polyepoxide will range from 100 to 2000, typically from 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

Epoxy functional film-forming resins used in the first coating composition may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

When the first coating composition used in the multi-component composite coating composition of the present invention is electrodepositable, the epoxy functional resin typically also contains ionic groups, typically cationic salt groups.

Appropriate mixtures of film-forming resins may also be used in the multi-component composite coating of the present invention. The amount of the film-forming resin in the first coating composition generally ranges from 25 to 95 percent by weight based on the total weight of resin solids in the first coating composition.

One or more first coating compositions may be used in the multi-component composite coating composition of the present invention, and as mentioned above, may be selected from at least one of electrodepositable film-forming compositions, primers, pigmented monocoats, pigmented base coats, transparent topcoats, industrial coatings and other coatings commonly used in the original equipment manufacture of automobiles or in automotive refinish. If desired, the first coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries. These materials can constitute up to 40 percent by weight of the total weight of the first coating composition.

The first coating composition can be applied to the substrate by any means, including conventional means such as electrodeposition, brushing, dipping, flow coating, spraying and the like. In the process of electrodeposition, the metal substrate being coated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

The usual spray techniques and equipment for air spraying and electrostatic spraying and either manual or automatic methods can be also be used for application of the first coating composition to the substrate.

After application of the optional first coating composition to the substrate, a film is formed on the surface of the substrate by driving water and/or organic solvents out of the film (flashing) by heating or by an air-drying period. If more than one first coating composition is applied to the substrate, flashing may be done after the application of each coating layer.

The coated substrate is then heated to at least partially cure the first coating composition. In the curing operation, solvents are driven off and the film-forming materials are crosslinked. The heating or curing operation is usually carried out at a temperature in the range of from 160-350° F. (71-177° C.) but if needed, lower or higher temperatures may be used as necessary to activate crosslinking mechanisms. Again, if more than one first coating composition is applied to the substrate, curing may be done after the application of each coating layer, or curing of multiple layers simultaneously is possible.

The second coating composition may be applied over at least a portion of the substrate, or over at least a portion of the first coating in embodiments where the present invention is a composite coating. The sprayable polyurea compositions used as the second coating composition in the multi-component composite coating of the present invention typically are two-component compositions, including an isocyanate-functional component and an amine-functional component. In one embodiment of the present invention, the polyurea coating is formed using a process comprising the following steps: (a) selecting an isocyanate-functional component and an amine-functional component such that the ratio of equivalents of isocyanate groups to equivalents of amine groups is greater than 1 while the volume mixing ratio of the isocyanate-functional component to the amine-functional component is capable of being applied to a substrate at 1:1; (b) mixing the isocyanate-functional component and the amine-functional component in a volume ratio to produce a reaction mixture; and (c) applying the reaction mixture to a substrate to form a polyurea coating on the substrate.

A polyurea coating prepared by the process in this embodiment of the present invention results in a coating with acceptable tack-free time and a rapid, predictable cure time. The controlled cure rate of the process of the present invention can result in a two-coat application of a polyurea coating having a textured surface.

Such polyurea compositions may be prepared according to the process using a two-component mixing device. In a particular embodiment, the polyurea compositions may be prepared using a high pressure impingement mixing device in which equal volumes of an isocyanate-functional component and an amine-functional component are impinged upon each other and immediately sprayed onto at least a portion of the substrate or the first coating composition to produce a second coating thereover. The isocyanate-functional component and the amine-functional component react to produce a polyurea composition which is cured upon application to the substrate or the first coating on the substrate. High-pressure impingement mixing is particularly useful in preparing coatings from polymeric systems that have very fast reaction kinetics such as in the preparation of a polyurea. Polyurea coatings are typically formulated with a stream of an isocyanate-functional component herein referred to as an "A-side" and a stream of an amine-functional component herein referred to as a "B-side". The A-side containing the isocyanate-functional component may be at least one polyisocyanate including monomers, prepolymers, oligomers, or a blend of polyisocyanates. A prepolymer is a polyisocyanate which is pre-reacted with a sufficient amount of polyamine(s) or other isocyanate reactive components (such as one or more polyols as are well known in the art) so that reactive sites on the polyisocyanate still remain in the prepolymer. Those remaining reactive sites on the polyisocyanate prepolymer are then available to react further with components in the B-side.

The present invention is described hereafter in the use of monomeric polyisocyanates, but this is not meant to be limiting. The present invention encompasses those coating compositions comprising a polyisocyanate prepolymer, as described above, or a blend of polyisocyanates; e.g., a blend of one or more polyisocyanate prepolymers and/or one or more monomeric polyisocyanates. Suitable polyisocyanate reactants used on the A-side include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Aliphatic isocyanates are particularly useful in producing polyurea coatings which are resistant to degradation by UV light. However, in other circumstances, less costly aromatic polyisocyanates may be used when durability is not of significant concern. Non-limiting examples of aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

An excess of polyisocyanate monomer (i.e., residual free monomer from the preparation of prepolymer) can decrease the viscosity of the polyurea composition, allowing for improved flow over the substrate or the first coating composition. Excess polyisocyanate monomer also has been observed in some instances to provide improved adhesion of the polyurea coating to a previously applied coating and/or to the substrate itself. For example, the cured coatings that have previously been applied to automotive surfaces can comprise functional groups (e.g. hydroxyl groups) that are reactive to isocyanates, thereby enhancing adhesion of the sprayed polyurea composition to the first coating. A lower viscosity polyurea composition also keeps the composition in a flowable state for a longer period of time. In a particular embodiment of the present invention, at least 1 percent by weight, or at least 2 percent by weight, or at least 4 percent by weight of the isocyanate-functional composition comprises at least one polyisocyanate monomer (i.e., residual free polyisocyanate monomer).

It is to be understood that the use of various oligomeric polyisocyanates (e.g., dimers, trimers, polymeric, etc.) and modified polyisocyanates (e.g., carbodiimides, uretone-imines, etc.) is also within the scope of the invention. The A-side or the B-side also may include inert components such as fillers, stabilizers and pigments as are well known in the art of surface coatings.

Amines suitable for use in B-side of the second coating composition of the present invention may be primary, secondary, tertiary amines or mixtures thereof. The amines may be monoamines, or polyamines such as diamines, triamines, higher polyamines and/or mixtures thereof. The amines also may be aromatic or aliphatic (e.g., cycloaliphatic). In one embodiment, the amine component comprises aliphatic amines to provide enhanced durability. The amine typically is provided as a liquid having a relatively low viscosity (e.g., less than about 100 mPa·s at 25° C.). In one embodiment no primary amine is present in the amine component. In a particular embodiment, the amine component is based upon mixtures of primary and secondary amines. For example, if a mixture of primary and secondary amines is employed, the primary amine can be present in an amount of 20 to 80 percent by weight or 20 to 50 percent by weight, with the balance being secondary amines. Although others can be used, primary amines present in the composition generally have a molecular weight greater than 200 (e.g., for reduced volatility), and secondary amines present generally comprise diamines with molecular weights of at least 190 (e.g., 210-230).

In one particular embodiment, the amine-functional component includes at least one secondary amine present in an amount of 20 to 80 percent by weight or 50 to 80 percent by weight. Suitable secondary amines can include acrylate and methacrylate "acrylate and methacrylate modified amines" is meant both mono- and poly-acrylate modified amines as well as acrylate or methacrylate modified mono- or poly-amines. Such acrylate or methacrylate modified amines typically comprises aliphatic amines. Examples of suitable aliphatic polyamines include, without limitation, ethylamine, the isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

In an embodiment of the present invention, the secondary amine includes an aliphatic amine, such as a cycloaliphatic diamine. Such amines are available commercially from Huntsman Corporation (Houston, Tex.) under the designation of JEFFLINK™ such as JEFFLINK™ 754. In another embodiment, the amine can be provided as an amine-functional resin. Such amine-functional resin can be a relatively low viscosity, amine-functional resin suitable for use in the formulation of high solids polyurea coatings. While any of a number of different amine-functional resins may be suitable, in one embodiment of the invention, the amine-functional resin comprises an ester of an organic acid, for example, an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. One example of such polyaspartic esters is the derivative of diethyl maleate and 1,5-diamino-2-methylpentane, available commercially from Bayer Corporation of Pittsburgh, Pa. under the trade name DESMOPHEN NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

The amine-functional component also may include high molecular weight primary amines, such as polyoxyalkyleneamines. The polyoxyalkyleneamines contain two or more primary amino groups attached to a backbone, derived, for example, from propylene oxide, ethylene oxide, or a mixture thereof. Examples of such amines include those available under the designation JEFFAMINE™ from Huntsman Corporation. Such amines typically have a molecular weight ranging from 200 to 7500, such as, without limitation, JEFFAMINE D-230, D-400, D-2000, T-403 and T-5000.

The volume ratio of the isocyanate-functional component to the amine-functional component in a mixing device may be any suitable volume mixing ratio capable of being applied to a substrate, such as at 1:1. A 1:1 volume ratio may be selected to ensure proper mixing within a standard impingement mixing device. One example of a commercially available mixing device accepted for use in the automotive industry is a GUSMER™ VR-H-3000 proportioner fitted with a GUSMER™ Model GX-7 spray gun. In that device, pressurized streams of components of the A-side and the B-side are delivered from two separate chambers of a proportioner and are impacted or impinged upon each other at high velocity to effectuate an intimate mixing of the two components to form a polyurea composition, which is coated onto the desired substrate via the spray gun. During mixing, the components are atomized and impinged on each other at high pressure. Superior control of the polyurea reaction is achieved when the forces of the component streams are balanced. The mixing forces experienced by the component streams are determined by the volume of each stream entering the mixing chamber per unit time and the pressure at which the component streams are delivered. A 1:1 volume ratio of the components per unit time serves to equalize those forces. A 1:1 volume ratio of isocyanate to amine can be particularly relevant for the automotive OEM application of sprayable polyurea truck bed-liners.

Other application/mixing devices known in the art can be used to apply the polyurea compositions of the present invention. One suitable application device is commonly known in the industry as a "static mix tube" applicator. In such a static mix tube, the isocyanate component and the amine component are each stored in a separate chamber or container. As pressue is applied, each of the components is brought into a mixing tube in a 1:1 ratio by volume. Mixing of the components is effected by way of the torturous or cork screw pathway within the tube. The exit end of the tube may have atomization capability useful in spray application of the reaction mixture. Alternatively, the fluid reaction mixture can be applied to the substrate as a bead. A suitable static mix tube applicator is available from Cammda Corporation. Another design, available from V. O. Baker, is a dual cartridge syringe applicator with either a pneumatic or manual pump applicator.

The ratio of equivalents of isocyanate groups to amine groups may be selected to control the rate of cure of the polyurea coating composition, thereby affecting adhesion. It has been found that two-component polyurea compositions capable of being produced, or capable of being applied to the substrate, in a 1:1 volume ratio have advantages particularly in curing and adhesion to the first coating composition when the ratio of the equivalents of isocyanate groups to amine groups (also known as the reaction index) is greater than one, such as 1.01 to 1.10:1, or 1.03 to 1.10, or 1.05 to 1.08. "Being capable of being produced in a 1:1 volume ratio" or "capable of being applied to the substrate in a 1:1 volume ratio" means that the volume ratio varies by up to 20% for each component, or up to 10% or up to 5%. The isocyanate-functional component and the amine-functional component can be selected from any of the isocyanates (including polyisocyanates) and amines listed above to provide a reaction index that is greater than one, while being capable of being applied in a 1:1 volume ratio and acceptable performance of the resulting coating.

In some instances, a desired physical property of a polyurea coating composition for a truck bed-liner is surface texture. Surface texture can be created by first spraying the polyurea composition onto the first coating composition to produce a smooth, substantially tack-free first layer. By "substantially tack-free" is meant the condition wherein upon gently touching the surface of the layer with a loose fitting glove, the glove tip does not stick, or otherwise adhere, to the surface as determined by the Tack-Free Method. The Tack-Free Method provides that the coating composition be sprayed in one coat onto a non-adhering plastic sheet to a thickness of 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. A time beginning from the completion of spraying until when the coating is substantially tack-free is said to be the tack-free time. The tack-free time and the cure time for the polyurea composition may be controlled by balancing levels of various composition components, for example, by balancing the ratio of primary amine to secondary amines. A second or subsequent layer of the polyurea composition then can be applied to the first layer as a texturizing layer or "dust coating". This may be accomplished, for example, by increasing the distance between the application/mixing device and the coated substrate to form discrete droplets of the polyurea composition prior to contacting the coated substrate thereby forming controlled non-uniformity in the surface of the second layer. The substantially tack-free first layer of the polyurea coating is at least partially resistant to the second polyurea layer; i.e., at least partially resistant to coalescence of the droplets of polyurea composition sprayed thereon as the second polyurea layer or dust coating, such that the droplets adhere to, but do not coalesce with, the first layer to create surface texture. Typically the second polyurea layer exhibits more surface texture than the first polyurea layer. An overall thickness of the two polyurea layers may range from 20 to 120 mils, such as from 40 to 110 mils, or from 60 to 100 mils (1524-2540 microns) with the first layer being one half to three quarters of the total thickness (762-1905 microns) and the dust coating being one fourth to one half of the total thickness (381-1270 microns). Note further that each layer of the polyurea coating may be deposited from different compositions. In one embodiment, the first layer is deposited from a polyurea composition comprising an aromatic amine component and an aromatic polyisocyanate component, while the second layer is deposited from a polyurea composition comprising an aliphatic amine component and an aliphatic polyisocyanate component. It should be noted that the "first" polyurea coating layer may comprise one, two, three or more layers, and the "second" polyurea coating layer may be one or more subsequent layers applied thereover. For example, in one embodiment of the present invention four polyurea layers may be applied, with the fourth layer being the dust coating, with each layer having a thickness ranging from 15 to 25 mil (381-635 microns).

The polyurea composition may also include one or more additives, for example, a light stabilizer, thickener, pigment, fire retardant, adhesion promoter, catalyst or other performance or property modifiers. Such additives are typically provided in the A-side but may instead be provided in the B-side or in both.

In a particular embodiment of the present invention, the polyurea composition further comprises, usually in the amine-functional component (B-side) a clay and optionally a silica. In this embodiment, a coating layer formed from the two-component polyurea coating composition over a surface of a metal substrate has been found to have better adhesion to the metal substrate than a similar coating composition without a clay or a silica as determined according to the test method outlined in ASTM D 1876, without use of a fixturing device.

The clay may be selected from any of a variety of clays known in the art including montmorillonite clays such as bentonite, kaolin clays, attapulgite clays, sepiolite clay, and mixtures thereof. Additionally, the clay may be surface treated as is known in the art. Any suitable surface treatment may be used; for example, one or more amines according to the following structures:

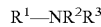

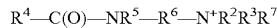

wherein $R^1$ and $R^4$ are independently $C_4$-$C_{24}$ linear, branched, or cyclic alkyl, aryl, alkenyl, aralkyl or aralkyl, $R^2$, $R^3$, $R^5$ and $R^7$ are independently H or $C_1$-$C_{20}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene. As a non-limiting example, surface treated bentonite may be used, such as the alkyl ammonium bentonites described in U.S. Pat. No. 3,974,125.

In an embodiment of the invention, the clay is present in the polyurea composition at a level of at least 0.5 percent by weight, in some cases at least 1 percent by weight and in other cases at least 1.5 percent by weight. Also, the clay can be present at up to 6 percent by weight, in some cases up to 5 percent by weight, and in other cases up to 4 percent by weight of the composition. The amount of clay in the two-component polyurea composition can be any value or range between any values recited above, provided the adhesion properties and application viscosity of the polyurea composition are not adversely affected.

As mentioned above, the two-component polyurea composition can optionally include a silica. Any suitable silica can be used, so long as it is a suitable thixotrope that does not compromise application and coating performance properties. In a particular embodiment of the invention, the silica comprises fumed silica.

When present, the silica is present in the two-component coating composition at a level of at least 0.5 percent by weight, in some cases at least 1 percent by weight and in other cases at least 1.5 percent by weight. Also, the silica can be present at up to 6 percent by weight, in some cases up to 5 percent by weight, and in other cases up to 4 percent by weight of the composition. The amount of silica in the two-component coating composition can be any value or range between any values recited above, provided the adhesion properties and application viscosity of the polyurea composition are not adversely affected.

One embodiment of the present invention includes the use of an adhesion promoter for enhancing adhesion of the polyurea composition to the substrate. In an embodiment of the present invention, the substrate may comprise bare metal (including an anodized metal), pretreated metal, or as noted above, there may be a first coating or multi-layer composite coating over which the polyurea composition is applied as part of a multi-component composite coating, selected from electrodepositable film-forming compositions, primer compositions, pigmented or non-pigmented monocoat compositions, pigmented or non-pigmented base coat compositions, transparent topcoat compositions, industrial coating compositions, and other coatings commonly used in the original equipment manufacture of automobiles or in automotive refinish. When the polyurea coating is applied over a first coating, the multi-component composite coating of the present invention typically further comprises an adhesion promoting composition, the adhesion promoting composition being included in at least one of the first and second coating compositions, and/or applied as a separate layer over at least a portion of the first coating layer prior to application of the second coating composition. In this embodiment, the second polymeric layer can have a 90° peel adhesion resistance of at least 5 ft-lbs., or at least 10 ft-lbs., or at least 15 ft-lbs as determined according to the test method outlined in ASTM D 1876, without use of a fixturing device.

The adhesion promoter may be provided with the polyurea components in either the A-side or B-side or both. Alternatively, the adhesion promoter may be applied as a separate layer directly to the substrate or first coating prior to application of the polyurea coating thereto. When applied as a separate layer, the adhesion promoter may be dispersed or dissolved in a carrier such as an organic solvent or water which is evaporated prior to application of the polyurea coating. Alternatively, the adhesion promoter may be in a form which allows for direct application to the substrate. The adhesion promoter may also be a component of the first coating composition. In any case, it may be applied by wiping, dipping, roll coating, curtain coating, spraying or other application techniques as are well known in the art.

Examples of suitable adhesion promoters include amines (such as tertiary amines or melamines), amino silanes, metal complexes and urethane acrylate compositions. The underlying mechanism which enhances adhesion of the polyurea coating to the substrate by the adhesion promoter may involve one or more phenomenon such as but not limited to catalysis of a reaction between reactive groups on the substrate or previously applied coating (e.g. hydroxyl groups) and functional groups of the polyurea composition, reaction with the substrate or bonding with the substrate such as via hydrogen bonding.

Suitable tertiary amines for use as adhesions promoters include 1,5-diazabicyclo[4.3.0]non-5-ene, 1,8-diazabicyclo [5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene. An example of an amino silane for use as an adhesion promoter is y-aminopropyltriethoxysilane (commercially available as Silquest A100 from OSY Specialties, Inc.). Other suitable amine-functional adhesion promoters include 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as Polycat® 15 from Air Products and Chemicals, Inc., blocked amines such as an adduct of IPDI and dimethylamine, a melamine such as melamine itself or an imino melamine resin (e.g. Cymel® 220 or Cymel® 303, available from Cytec Industries Inc.). Metal-containing adhesion promoters may include metal chelate complexes such as an aluminum chelate complex (e.g. K-Kat 5218 available from King Industries) or tin-containing compositions such as stannous octoate and organotin compounds such as dibutyltin dilaurate and dibutyltin diacetate. Other adhesion promoters may include salts such as chlorine phosphate, butadiene resins such as an epoxidized, hydroxyl terminated polybutadiene resin (e.g. Poly bd® 605E available from Atofina Chemicals, Inc.), polyester polyols (e.g. CAPA® 3091, a polyester triol available from Solvay America, Inc., and urethane acrylate compositions such as an aromatic urethane acrylate oligomer (e.g. CN999 available from Sartomer Company, Inc.).

In one embodiment of the present invention, the adhesion promoting composition comprises at least one component selected from melamine, a urethane acrylate, a metal chelate complex, a salt, a tin-containing compound and a polyhydric polymer. Suitable melamines include those disclosed above in reference to the crosslinking agents.

In a particular embodiment, the present invention provides a coated substrate, vehicle, or vehicle substrate, comprising a first substrate coated with a first coating composition and a second substrate, typically a truck bed, coated with at least one layer of at least one sprayable polyurea composition, or any of the multi-component composite coatings as disclosed above, deposited over at least a portion of the second substrate. In this embodiment, the first coating composition on the first substrate and at least one layer of the polyurea coating composition comprises one or more pigments, typically color or effect-enhancing pigments, such that at least a portion of the coated vehicle substrate has a color that substantially corresponds to the color of an associated vehicle body. The pigments may be present in either or both of the first polyurea layer and the second, texturizing polyurea layer as part of the polyurea coating. In this embodiment, the color of the second substrate, typically a truck bed coated with at least one polyurea coating composition, is substantially the same as the color of the vehicle body.

Pigments suitable for this purpose can include metallic pigments or organic or inorganic color pigments. Suitable metallic pigments include in particular aluminum flake, copper bronze flake and micaceous pigments such as metal oxide coated mica. Besides the metallic pigments, the coating compositions also or alternatively may contain non-metallic color pigments including inorganic pigments such as titanium dioxide, iron oxide, chromium oxide, lead chromate, and carbon black, and organic pigments such as phthalocyanine blue and phthalocyanine green. In general, the pigment can be incorporated into each coating composition in amounts of about 1 to 80 percent by weight based on the total weight of coating solids. The metallic pigment can be employed in amounts from 0.5 to 25 percent by weight based on the total weight of coating solids.

The present invention additionally relates to a composite article that includes (A) a carrier film having a first and second major surface, and (B) a coating layer superimposed on the first surface of the film, the coating layer formed from a polyurea coating composition that contains at least one isocyanate-functional component and at least one amine-functional component as described above.

Any suitable carrier film can be used in this embodiment so long as the coating layer (B) can be superimposed thereon. Suitable carrier films include, but are not limited to thermoplastic materials, thermosetting materials, metal foils, cellulosic paper, and synthetic papers.

In a further embodiment of the invention, the carrier film comprises a suitable metal foil. As used herein, the term "foil" refers to a thin and flexible sheet of metal. Suitable metal foils that can be used in the carrier film of the invention include, but are not limited to those containing aluminum, iron, copper, manganese, nickel, combinations thereof, and alloys thereof. A particular embodiment of the invention is shown in FIG. 1, where metal foil carrier film 4 is coated by coating layer 2.

In an embodiment of the invention, the carrier film comprises a suitable thermoplastic material. As used herein, the term "thermoplastic material" refers to any material that is capable of softening or fusing when heated and of solidifying (hardening) again when cooled. Suitable thermoplastic materials that can be used as the carrier film of the invention include, but are not limited to, those containing polyolefins, polyurethanes, polyesters, polyamides, polyureas, acrylics, and mixtures thereof.

In another embodiment of the invention, the carrier film comprises a suitable thermosetting material. As used herein, the term "thermosetting material" refers to any material that becomes permanently rigid after being heated and/or cured. Suitable thermosetting materials that can be used as the carrier film of the invention include, but are not limited to those containing polyurethane polymers, polyester polymers, polyamide polymers, polyurea polymers, polycarbonate polymers, acrylic polymers, resins, copolymers thereof, and mixtures thereof.

In an additional embodiment of the invention, the carrier film comprises synthetic paper. As used herein, the term "synthetic paper" refers to synthetic plain or calendered sheets that can be coated or uncoated and are made from films containing polypropylene, polyethylene polystyrene, cellulose esters, polyethylene terephthalate, polyethylene naphthalate, poly 1,4-cyclohexanedimethylene terephthalate, polyvinyl acetate, polyimide, polycarbonate, and combinations and mixtures thereof. The coated papers can include a substrate coated on both sides with film forming resins such as polyolefin, polyvinyl chloride, etc. The synthetic paper can contain, in suitable combination, various additives, for instance, white pigments such as titanium oxide, zinc oxide, talc, calcium carbonate, etc., dispersants, for example, fatty amides such as stearamide, etc., metallic salts of fatty acids such as zinc stearate, magnesium stearate, etc., pigments and dyes, such as ultramarine blue, cobalt violet, etc., antioxidant, fluorescent whiteners, and ultraviolet absorbers. A non-limiting example of synthetic papers that can be used in the present invention are those available under the tradename TESLIN®, available from PPG Industries, Inc., Pittsburgh, Pa.

Figure 2:
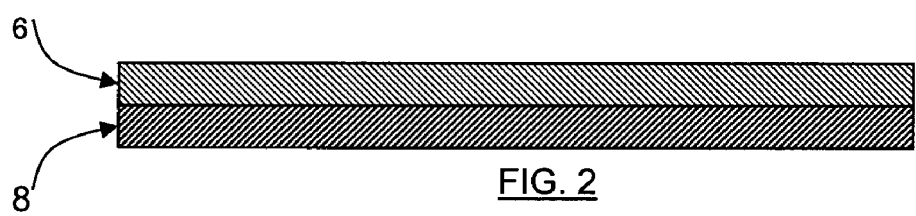
FIG. 2 is a composite article according to an embodiment of the invention including a plastic or synthetic paper carrier film having a coating layer on one side.

A particular embodiment of the invention is shown in FIG. 2, where carrier film 8 is a thermoplastic material, a thermosetting material, or a synthetic paper, which is coated by coating layer 6.

In a particular embodiment of the invention, the carrier film has a film thickness of at least 0.5 μm, in some cases at least 1 μm, in other cases at least 2 μm, in some situations at least 3 μm and in other situations at least 5 μm. Also, the carrier film can be up to 100 μm, in some cases up to 90 μm, in other cases up to 75 μm, in some situations up to 50 μm and in other situations up to 40 μm thick. The carrier film can be any thickness and can vary and range between any thickness recited above, provided the carrier film can adequately support the coating layer (B) and is sufficiently flexible for a given end use application.

As indicated above, the coating layer is formed on the carrier film from at least one coating composition that comprises any of the polyurea compositions described above.

In the present invention, the two-component polyurea coating is formed on a carrier film by: (I) selecting (A) a first component including at least one isocyanate-functional material, and (B) a second component including at least one amine-functional material, where the volume ratio of (A) to (B) is 1:1, and the equivalent ratio of isocyanate groups to amine groups is from 1.03:1 to 1.1:1; (II) mixing (A) and (B) to form a reaction mixture; and (III) applying the reaction mixture to a surface of the carrier film to form a polyurea coating on the carrier film.

In a particular embodiment of the invention, the two-component composition is sprayable and the composite article can be made by spraying the coating compositions onto the film, such as by using a two-component mixing device described above.

In an embodiment of the invention, the carrier film may include an adhesive layer superimposed on the second surface of the film. Any suitable adhesive composition known in the art can be used to form the adhesive layer. Suitable adhesive compositions include those that contain at least one acrylic latex polymer prepared from a monomer composition that includes $C_1$-$C_5$ linear, branches, or cyclic alkyl(meth)acrylate monomers.

In a further embodiment, a temporary protective cover may be superimposed over the adhesive layer. Any suitable material can be used as the protective cover. Suitable materials include, but are not limited to, paper and polymeric materials.

Figure 3:
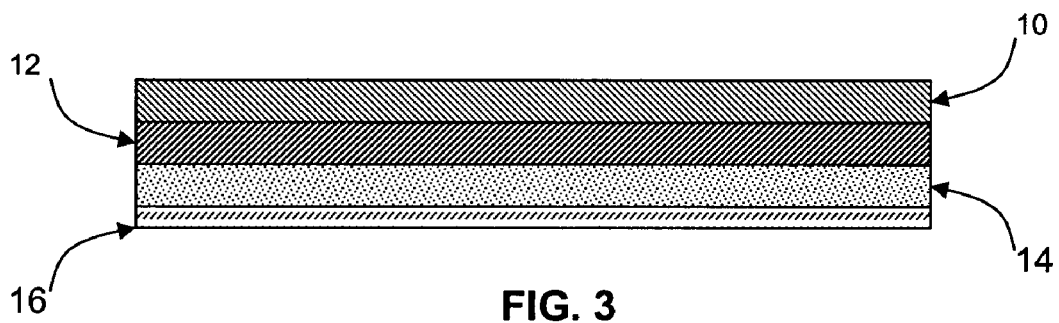
FIG. 3 is a composite article according to an embodiment of the invention including a plastic or synthetic paper carrier film having a coating layer on one side, an adhesive layer on the other side, and a protective layer over the adhesive layer.

A particular embodiment of the invention is shown in FIG. 3, where carrier film 12 is a thermoplastic material, a thermosetting material, or a synthetic paper, which is coated on a first side by coating layer 10. Adhesive layer 14 is coated on a second side of carrier film 12, which is in turn covered by protective layer 16.

The following examples are intended to illustrate the invention, and should not be construed as limiting the invention in any way.

EXAMPLES

A polyurea composition was produced from the formulation of Example 1 in Table 1 by mixing a 1:1 volume ratio of the A-side components to the B-side components in a high-pressure impingement mixing device manufactured by Gusmer Corporation.

The A-side components were premixed and charged into one holding chamber of the mixing device. The A-side was prepared by preparing a prepolymer by mixing the IPDI, terathane, butanediol, and neopentyl glycol under nitrogen. A catalytic amount of dibutyl tin dilaurate (DBTL) was added and the mixture was stirred for 15 minutes. The reaction mixture was first heated to 40° C. and then to 100° C. The resulting prepolymer was cooled to 80° C. and poured into 95% of the Desmodur N3400 and stirred for 15 minutes. Additional Desmodur N3400 was added to adjust the isocyanate equivalent weight.

The ratio of equivalents of isocyanate to amine was calculated as being 1.04.

Another polyurea composition was produced from the formulation of Example 2 in Table 1. The ratio of equivalents of isocyanate to amine was calculated as being 1.08.

TABLE 1

| Component | percent by weight | |
|---|---|---|
| | EX. 1 | EX. 2 |
| A-side | | |
| IPDI (diisocyanate) | 26.8 | 26.8 |
| Desmodur N3400 (diisocyanate) | 50.0 | 50.0 |
| Terathane 650 | 20.8 | 20.8 |
| 1,2-butanediol | 1.2 | 1.2 |
| Neopentyl glycol | 1.2 | 1.2 |
| B-side | | |
| Jeffamine T-3000 (polyoxyalkylene primary amine) | 30.8 | 33.8 |
| Desmophen NH 1220 (amine-functional aspartic acid ester) | 29.5 | 29.8 |
| Jefflink 754 (alicyclic secondary amine) | 34.4 | 31.1 |
| Irganox 1135 (hindered phenolic antioxidant) | 0.02 | 0.02 |
| Tinuvin 328 (benzotriole UV absorber) | 0.02 | 0.02 |
| Molecular sieve Type 3A (Potassium/sodium aluminate) | 0.5 | 0.5 |
| Aerosil 200/Cab-O-Sil M-5 (silicon dioxide) | 3.0 | 1.75 |
| Aerosil R972 (silicon dioxide) | 0.5 | — |
| Z-6020 Silane (amino silane) | 0.02 | 0.02 |
| Vulcan XC-72R (carbon black powder) | 1.2 | 1.2 |
| Bentone (bentonite clay) | — | 1.74 |

Whereas particular embodiments of this invention have been described above for purposes of illustration, it will be evident to those skilled in the art that numerous variations of the details of the present invention may be made without departing from the invention as defined in the claims.

Therefore, what is claimed is:

1. A polyurea coating composition, the coating composition being formed from a reaction mixture comprising:
an isocyanate-functional component and an amine-functional component wherein the ratio of equivalents of isocyanate groups to equivalents of amine groups is greater than 1 while the volume mixing ratio of the isocyanate-functional component to the amine-functional component is capable of being applied to a substrate at 1:1; wherein at least 1 percent by weight of the isocyanate-functional component comprises at least one polyisocyanate monomer and wherein the isocyanate-functional component further comprises the reaction product of a polyisocyanate and two or more polyols, and wherein the amine component comprises an aspartic ester-based amine-functional resin.

2. The coating composition of claim 1, wherein the ratio of equivalents of isocyanate groups to equivalents of amine groups is 1.01 to 1.10:1.0.

3. The coating composition of claim 1, wherein the isocyanate-functional component comprises isophorone diisocyanate.

4. The coating composition of claim 1, wherein the amine-functional component comprises a primary amine and/or a secondary amine.

5. The coating composition of claim 1, wherein the amine-functional component comprises 20-80 weight percent primary amine and the balance secondary amine.

6. A multi-component composite coating comprising a first polyurea layer deposited from a first composition, and a second polyurea layer deposited from a second composition, applied over at least a portion of the first polyurea layer, wherein at least one of the first composition and the second composition comprises the coating composition of claim 1.

7. A coated article, comprising:
a substrate; and
the polyurea coating composition of claim 1 deposited on at least a portion of the substrate.

8. The coated article of claim 7, wherein the substrate is a vehicle substrate.

9. The polyurea coating composition of claim 1, wherein the reaction mixture further comprises a clay and, optionally, a silica.

10. The polyurea coating composition of claim 9, wherein the amine component comprises a clay and, optionally, a silica.

11. The polyurea coating composition of claim 9, wherein the clay comprises montmorillonite clays, kaolin clays, attapulgite clays, and/or sepiolite clays.

12. A multi-component composite coating comprising:
at least one first coating formed from a first coating composition applied to at least a portion of at least one major surface of a substrate, wherein the first coating composition comprises
at least one crosslinking agent; and
at least one film-forming resin having functional groups reactive with the crosslinking agent;
a second coating composition applied in at least one layer over at least a portion of the first coating to form a second coating thereover, wherein the second coating composition comprises the polyurea composition of claim 1; and
an adhesion promoting composition, wherein the adhesion promoting composition is included in at least one of the first and second coating compositions, and/or applied as a separate layer over at least a portion of the first coating prior to application of the second coating composition, and wherein the second coating has an ASTM D1876 90° peel adhesion resistance of at least 5 ft-lbs.

13. The multi-component composite coating of claim 12, wherein the adhesion promoting composition comprises a tertiary amine, a melamine, a urethane acrylate, a metal chelate complex, a polyhydric polymer, and/or a tin-containing compound.

14. The multi-component composite coating of claim 13, wherein the adhesion promoting composition comprises a tertiary amine comprising 1,5-diazabicyclo[4.3.0]non-5-ene, 1,8-diazabicyclo[5.4.0]undec-7-ene, and/or 1,4-diazabicyclo[2.2.2]octane.

15. The coated article of claim 7, wherein the substrate comprises a glass substrate.

16. The coating composition of claim 4, wherein the amine-functional component comprises a secondary amine comprising an acrylate-modified amine and/or a methacrylate-modified amine.

17. A method of forming a polyurea coating on a substrate comprising:
(a) selecting an isocyanate-functional composition and an amine-functional composition such that the ratio of equivalents of isocyanate groups to equivalents of amine groups is greater than 1 while the volume mixing ratio of the isocyanate-functional component to the amine-functional component is capable of being applied to the substrate at 1:1; wherein at least 1 percent by weight of the isocyanate-functional component comprises at least one polyisocyanate monomer and wherein the isocyanate-functional component further comprises the reaction product of a polyisocyanate and two or more polyols, and wherein the amine component comprises an aspartic ester-based amine-functional resin;
(b) mixing the isocyanate-functional composition and the amine-functional composition in a volume ratio to produce a reaction mixture; and
(c) applying the reaction mixture to a substrate to form a polyurea coating on the substrate.

18. The method of claim 17, wherein the mixing is accomplished by impingement, and the applying is performed by spraying.

19. The method of claim 18, wherein the reaction mixture is at least partially cured to form a substantially tack-free polyurea layer, the method further comprising applying a second polyurea layer over the at least partially cured polyurea layer wherein the partially cured polyurea layer is resistant to the second coating.

20. The method of claim 19, wherein the second layer, when cured, exhibits more surface texture than the first coating.

21. The method of claim 17, wherein the substrate is a vehicle substrate.

22. A method of forming a coated article, comprising:
providing a substrate; and
depositing a multilayer composite coating on at least a portion of the substrate to form the coated article, the multilayer composite coating comprising a first polyurea layer deposited from a first composition, and a second polyurea layer deposited from a second composition, applied over at least a portion of the first polyurea layer, at least one of the first composition and the second composition being formed from a reaction mixture comprising:
an isocyanate component; and
an amine component
wherein the ratio of equivalents of isocyanate groups to equivalents of amine groups in the reaction mixture is greater than 1 while the volume mixing ratio of the isocyanate-functional component to the amine-functional component is capable of being applied to a substrate at 1:1; and wherein at least 1 percent by weight of the isocyanate-functional component comprises at least one polyisocyanate monomer and wherein the isocyanate-functional component further comprises the reaction product of a polyisocyanate and two or more polyols, and wherein the amine component comprises an aspartic ester-based amine-functional resin.

23. The method of claim 22, wherein at least 1 percent by weight of the isocyanate-functional component comprises at least one polyisocyanate monomer.

24. The multi-component composite coating of claim 22, wherein the substrate is a vehicle substrate.

25. The multi-component composite coating of claim 24, wherein the second composition is formed from the reaction mixture and the reaction mixture further comprises one or more pigments such that at least a portion of the coated vehicle substrate has a color that substantially corresponds to the color of at least a portion of an associated vehicle body.

* * * * *

UNITED STATES PATENT AND TRADEMARK OFFICE
CERTIFICATE OF CORRECTION

PATENT NO.        : 7,611,772 B2
APPLICATION NO.   : 11/211188
DATED             : November 3, 2009
INVENTOR(S)       : Barancyk et al.

It is certified that error appears in the above-identified patent and that said Letters Patent is hereby corrected as shown below:

Column 20, line 54, and in claim 12, at column 25, line 55, for the term "ft-lbs.", each occurrence, should read --lbs./linear inch--.

Signed and Sealed this

Ninth Day of November, 2010

David J. Kappos
*Director of the United States Patent and Trademark Office*